No. 806,595. PATENTED DEC. 5, 1905.
G. STECK.
CONTAINING DEVICE.
APPLICATION FILED JAN. 16, 1905.
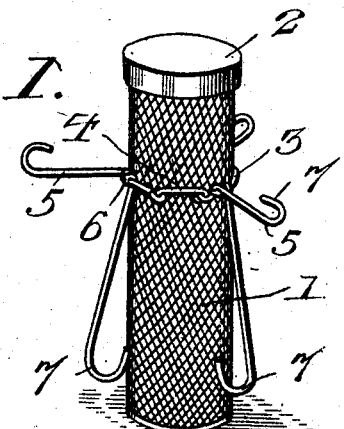
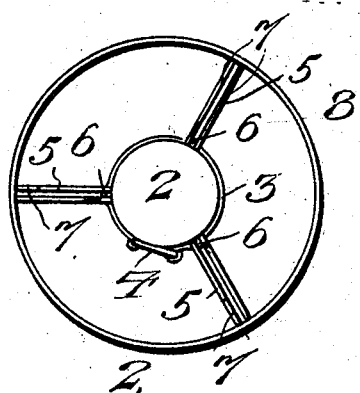
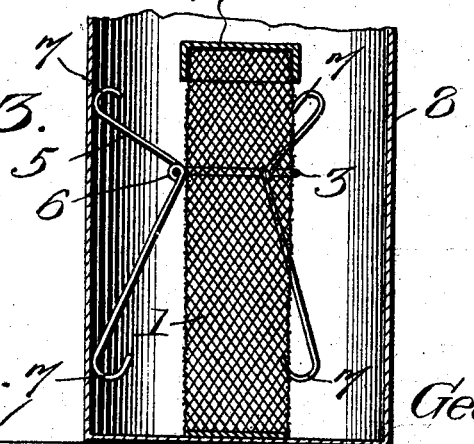

UNITED STATES PATENT OFFICE.

GEORGE STECK, OF WAUPUN, WISCONSIN.

CONTAINING DEVICE.

No. 806,595.  Specification of Letters Patent.  Patented Dec. 5, 1905.

Application filed January 16, 1905. Serial No. 241,314.

*To all whom it may concern:*

Be it known that I, GEORGE STECK, a citizen of the United States, residing at Waupun, in the county of Fond du Lac and State of Wisconsin, have invented new and useful Improvements in Containing Devices, of which the following is a specification.

This invention relates to a containing device adapted particularly for use in making coffee or tea.

In using coffee or tea pots it is necessary generally to employ a strainer attached to the mouth thereof to prevent the exit of the coffee or tea dregs.

The object of this invention is to make coffee or tea in such manner that the same is free from dregs, for which reason the necessity of employing a strainer at the spout of the coffee or tea pot is avoided.

With the foregoing and other minor objects in view, which will appear as the description proceeds, the invention resides in a containing device formed with a perforate body having novel means for holding the same in proper position within a coffee or tea pot.

The invention also resides in the particular combination and arrangement of parts and in the precise details of construction hereinafter described and claimed as a practical embodiment thereof.

In the accompanying drawings, forming part of this specification, Figure 1 is a perspective view of the containing device constructed in accordance with the invention. Fig. 2 is a plan view of the improved device arranged inside of a tea or coffee pot. Fig. 3 is a vertical section through a pot, showing the improved containing device in position.

Like reference-numerals indicate corresponding parts in the different views.

The improved containing device of this invention comprises a perforate body 1, which preferably is cylindrical in shape and is formed of wire-netting. The body 1 is provided at its upper end with a removable cap or cover 2. Surrounding the body 1 is a retaining-band 3, the ends of which preferably are drawn closely together and joined by means of a link 4. A plurality of angular or bent arms 5 are pivotally connected intermediate their ends to the body 1. The pivotal connection of the arms 5 with the body 1 is produced, preferably, by forming each of said arms with a plurality of coils 6 at the point of its angle, said coils surrounding the band 3, as shown clearly in Figs. 1 and 3. The ends of each of the arms 5 are bent rearwardly, as shown at 7, to prevent them from scratching the interior of the coffee or tea pot.

Constructed as above described the method of using the improved device will be apparent from Figs. 2 and 3. The coffee or tea is placed in a perforate body 1 and said body is inserted into a coffee or tea pot, such as indicated at 8, the angular arms 5 constituting means for spacing the containing device properly in the center of the tea or coffee pot and for holding it securely in position. As soon as the coffee or tea has been made the containing device is removed, together with the tea or coffee dregs therein.

In view of the fact that the arms 5 are adapted to be bent readily to any desired angle, so as to render the same more acute or obtuse, the improved containing device can be inserted into receptacles of different diameters, the coils 6 at the point of the angle of each arm 5 serving to permit the arm to be readily bent to a greater or less angle without danger of breaking the same.

Changes in the precise embodiment of invention illustrated and described may be made within the scope of the following claims without departing from the spirit of the invention or sacrificing any of its advantages.

Having thus described the invention, what is claimed as new is—

1. A containing device comprising a perforate body, a band surrounding said body about midway the ends thereof, and a plurality of angular arms formed intermediate their ends with coils surrounding said band.

2. A containing device comprising a perforate body, a cap therefor, a retaining-band surrounding said body about midway the ends thereof, a link connecting the ends of said retaining-band, and a plurality of angular arms having coils formed at the point of their angles surrounding said retaining-band, the ends of said arms being bent.

In testimony whereof I affix my signature in presence of two witnesses.

GEORGE STECK.

Witnesses:
 ED. HJONTRUD,
 G. A. BENSON.